Sept. 1, 1959    M. CHALOS    2,901,799
DEVICE FOR ANCHORING AND JOINING THE ENDS OF CABLES AND THE LIKE
Filed Feb. 11, 1955    2 Sheets-Sheet 1
Fig.1.
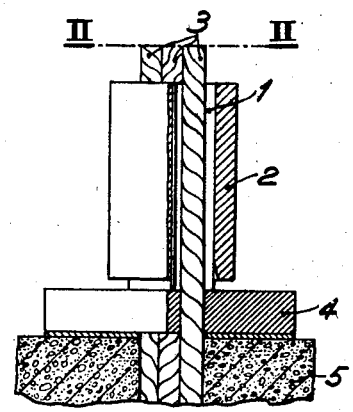
Fig.3.
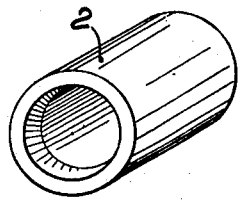
Fig.4.
Fig.2.
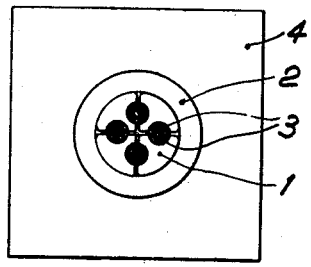
Fig.5.
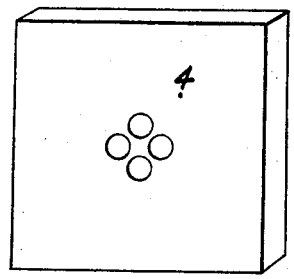
Fig.7.
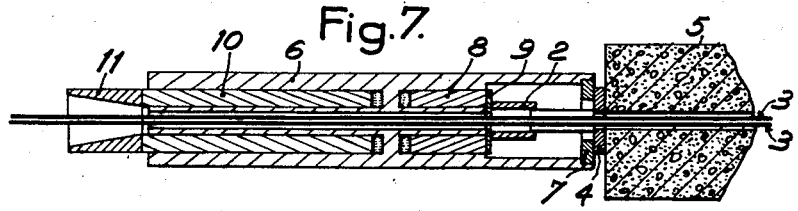
Fig.8.
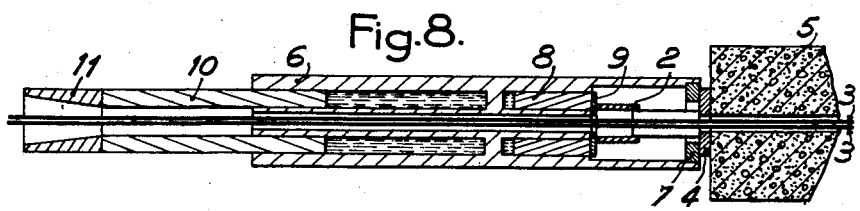
Inventor
M. Chalos
By Jacob K Downing Cleebold
Attys.

Sept. 1, 1959 M. CHALOS 2,901,799
DEVICE FOR ANCHORING AND JOINING THE ENDS OF CABLES AND THE LIKE
Filed Feb. 11, 1955 2 Sheets-Sheet 2
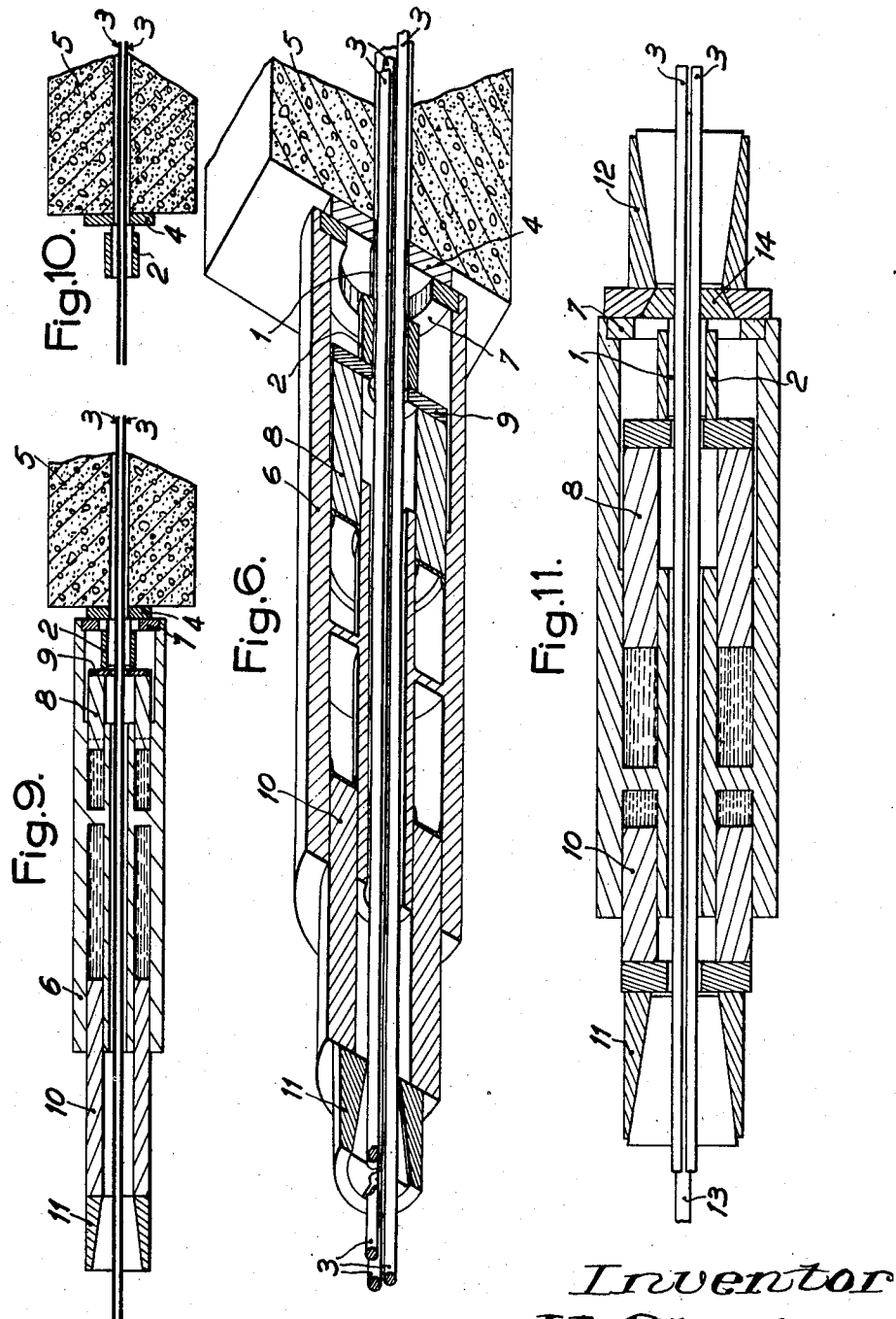
Inventor
M. Chalos United States Patent Office 2,901,799
Patented Sept. 1, 1959

2,901,799

DEVICE FOR ANCHORING AND JOINING THE ENDS OF CABLES AND THE LIKE

Marcel Chalos, Paris, France, assignor to Societe Anonyme dite: Societe des Grands Travaux de Marseille, Paris, France Application February 11, 1955, Serial No. 487,641

Claims priority, application France February 15, 1954

2 Claims. (Cl. 24—126)

The usual devices employed for anchoring the end of a cable, or the ends of a group of wires or strands rely on the wedging of the wire or strand ends between two metal surfaces, and the operation of devices of this general type is always attended by a certain amount of sliding or creeping of the wires to the extent required for properly wedging them. Therefore, these devices are inappropriate when the wire or strand tension is to be determined with much accuracy. In fact, the sliding movement or creeping cannot be determined beforehand with a sufficient accuracy, as calculus will provide only approximate data; moreover, the different elements to be wedged may slide to different degrees. Therefore, these two factors imply a certain uncertainty regarding the value of the stress applied to each element.

It is the object of this invention to provide a device for anchoring or fastening the end of a cable, rope, or groups of strands, wherein the wires or strands, after having been stretched to the desired tension value, are subsequently fastened by a locking device adapted to preclude any longitudinal sliding or creeping of the cable or strands concerned.

The locking device according to this invention comprises a set of keys having a T-shaped, curvilinear cross-section, there being as many keys in the set as strands to be fastened by the device, the cluster-like juxtaposition of these keys forming on the one hand parallel longitudinal channels adapted to receive the strands and on the other hand a cylindrical outer surface over which a cylindrical ferrule having a tapered end aperture is forced, as will be explained presently.

The pressure exerted by the ferrule on the key members should be sufficient to cause the strand wires to form on the inner or contact surface of the keys a large number of impressions as deep as 1/64" to 1/32", thereby producing a partial cold molding (stamping) of the keys on the strands. An efficient retaining means may be constituted by the resulting impressions, in spite of the requisite diametral tolerances of wire-mills, if the ferrule material, during the force-fitting of the ferrule over the strand and key assembly, is subjected to an expansion stress greater than its elastic limit but within its plastic deformation limits.

All these requirements may be adhered to by properly selecting the ferrule thickness and the characteristics of the materials constituting the ferrule and the keys.

During the ferrule fitting operation the strands are temporarily maintained under tension by a traction unit consisting of a wedging anchoring device of any known type but of which the dimensions have been increased to reduce the strand creeping during the wedging step proper.

When this temporary strand fastening is effective, the tension of the different strands may be equilized by subjecting them to a traction of which the value exceeds by at least 30% the desired service tension. This traction, which is greater than the conventional elastic limit of the strand metal, is maintained during about 10 minutes and then reduced to the desired, final value before the device for definitely securing the strands is operated.

Other features and advantages of the invention will appear as the following description proceeds with reference to the attached drawings forming part of this specification and illustrating diagrammatically by way of example a typical embodiment of the device and the manner in which it is utilized for either anchoring the end of a cable or wire as it issues from a concrete mass, or connecting the end of a cable with the end of another cable. In the drawings:

Figure 1 is a part-sectional view showing the device for anchoring the end portion of a cable issuing from a concrete mass.

Figure 2 is a section taken upon the line II—II of Fig. 1.

Figures 3, 4 and 5 are isometric views showing the component elements of the device illustrated in Figs. 1 and 2.

Figure 6 is an isometric view showing one-half of a device constructed according to the teachings of this invention, the section being made in an axial plane of the device, the parts being shown in their initial position before anchoring a cable issuing from a mass of concrete.

Figure 7 is an axial longitudinal section showing the parts in the same positions as in Fig. 6.

Figures 8, 9 and 10 are diagrammatical axial sections showing the assembly of Fig. 7 at different subsequent steps of the ferrule-fitting operation; and Figure 11 is an axial section showing the manner in which the device is employed for connecting the ends of two cables or ropes.

The device illustrated in Figs. 1 and 2 comprises key members 1 the longitudinal surfaces of which, as shown in Fig. 4, are so shaped that when a plurality (in this example four) of key members of this type are assembled in cluster fashion they form together on the one hand as many longitudinal channels adapted to receive the strands 3 of the cable, and on the other hand a cylindrical outer surface. A cylindrical ferrule 2 has a cylindrical coaxial bore terminating at one end with a slightly wide-mouthed or tapered aperture for facilitating the force threading of the ferrule 2 over the cluster-like key assembly. Thus, it will be sufficient to force the ferrule 2 over the cluster of keys to exert a radial inward compression on the strand wires between the surrounding inner surfaces of the key members 1, whereby these wires will be impressed as in a real stamping operation in these surfaces. Thus, the unit comprising the strands 3, key members 1 and ferrule 2 will constitute a rigid assembly obtained without permitting anyone of the strand-forming wires to recede or move in one or the other way.

Considering the case in which the strands 3 of the end portion of a cable are to be anchored as they issue from a concrete mass 5, a perforated plate 4, is threaded around the strands; this plate 4 extends normally to the longitudinal dimensions of the strands and acts as a bearing member to the keys 1 as they are placed between the strands, and the tapered inlet of the ferrule 2 is subsequently threaded thereover, according to the initial position shown in Figs. 1 and 6. As also shown in Fig. 6, the subsequent steps of the operation are effected with the assistance of a hydraulic ram of which the tubular cylindrical body 6 carrying at the front a thrust ring 7 comprises a pair of opposite annular pistons 8, 10 surrounding an axial chamber. These pistons 8, 10 carry at their opposite ends the former a thrust ring 9 and the latter a traction block 11. The axial chamber of this ram is threaded around the strands 3, the key members 1 and the ferrule 2 until the thrust ring 7 engages the plate 4, and until the traction block 11 engages the end portions of the strands 3.

When this initial setting is obtained, as also illustrated in Fig. 7, the piston 10 is actuated to pull the strands 3 through the medium of the traction block 11 until the desired cable tension is obtained, as shown in Fig. 8 of the drawings. Then the piston 8 is actuated to move the ferrule 2 over the cluster of key members 2 abutting against the plate 4, as shown in Fig. 9. Finally, by simply removing the ram the cable will be secured under the desired tension as shown in Fig. 1 or 10.

When it is desired to join the ends of two cables, the procedure illustrated in Fig. 11 is employed with the assistance of the ram of Fig. 6 but carrying in front of the thrust ring 7 another traction block 12. The strands 3 of the end portion of one of the cables to be joined are interposed in the strands 13 of the other cable, and the cluster-like key assembly 1 is so disposed that these strands 3, 13 extend in alternate fashion in the axial channels formed in the key assembly. Furthermore, in this case the plate 4 of Fig. 6 is replaced by a thrust member 14 positioned behind the other traction block 12 and adapted to support the thrust exerted by the key members 1. With the assembly thus disposed the piston 10 is actuated to pull through the traction block 11 the strand assembly 3, 13 to the left, the other end portions of these strands being clamped by the other traction block 12, until the desired cable tension is obtained. Then the piston 8 is actuated to force the ferrule 2 over the cluster-like key assembly 1, the latter being held against longitudinal movement by the thrust member 14.

Although the attached drawings and the above description refer only to two forms of embodiment of the invention, it will be readily understood by anybody conversant with the art, that many modifications and alterations may be brought thereto without departing from the spirit and scope of the invention as set forth in the appended claims.

What I claim is:

1. A clamp for anchoring a cable consisting of a plurality of strands on a stationary support having holes formed therethrough for the passage of said strands and under a desired predetermined tension, comprising key members of T-shaped curvilinear cross-section to be juxtaposed in-between said strands to form a cluster bearing on said stationary support, said cluster forming internally longitudinal channels and externally a cylindrical surface, and a ferrule having a cylindrical inner surface formed with a frustoconical inlet to be threaded on the cable and adapted to be forcibly thrust over said cluster of key members until said cluster of key members is completely engaged by said cylindrical inner surface while maintaining the desired tension on said cable, whereby said ferrule, key member and strand assembly will form by radial compression a rigid block anchoring the cable on said stationary support while maintaining it under the desired tension.

2. A clamp for anchoring on a stationary support and under a desired predetermined tension a coupling of two adjacent ends of two cables, each end consisting of a plurality of strands interlocked with the strands of the other end, said stationary support having holes formed therein for the passage of the strands of said two adjacent ends of the two cables, this clamp comprising key members of T-shaped curvilinear cross-section to be juxtaposed between said strands to form a cluster bearing on said stationary support, said cluster forming internally longitudinal channels and externally a cylindrical surface, and a ferrule having a cylindrical inner surface having a frustoconical inlet to be threaded on the cable and adapted to be forcibly thrust over said cluster of key members until said cluster of key members is completely engaged by said cylindrical inner surface while maintaining the desired tension on said cable, whereby said ferrule, key member and strand assembly will form by radial compression a rigid block anchoring the cable on said stationary support while maintaining it under the desired tension.

References Cited in the file of this patent

UNITED STATES PATENTS

| | | |
|---|---|---|
| 1,218,138 | Wachter | Mar. 6, 1917 |
| 1,258,580 | Lassiter | Mar. 5, 1918 |
| 1,454,088 | Thrift | May 8, 1923 |
| 1,606,789 | Hooley | Nov. 16, 1926 |
| 1,949,601 | Burd | Mar. 6, 1934 |
| 2,320,553 | Barnes et al. | June 1, 1943 |